W. LOUGHRIDGE.
HOSE AND PIPE-COUPLING.

No. 187,023. Patented Feb. 6, 1877.

WITNESSES.
Geo. H. Carman
C. E. Lewis

INVENTOR.
William Loughridge

UNITED STATES PATENT OFFICE.

WILLIAM LOUGHRIDGE, OF BALTIMORE, MARYLAND.

IMPROVEMENT IN HOSE AND PIPE COUPLINGS.

Specification forming part of Letters Patent No. 187,023, dated February 6, 1877; application filed July 19, 1876.

*To all whom it may concern:*

Be it known that I, WILLIAM LOUGHRIDGE, of the city of Baltimore and State of Maryland, have invented a new and Improved Coupling for Hose and Pipes, and closing the ends thereof, which improvement is fully set forth in the following specification, reference being had to the accompanying drawings.

Figure 6:
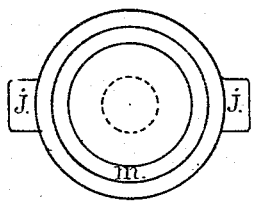
Figure 2:
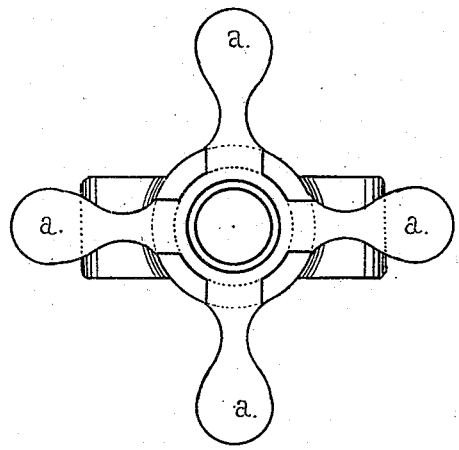
Figure 5:
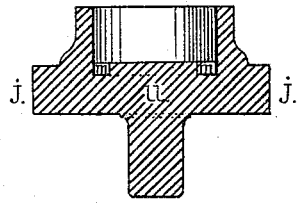
Figure 4:
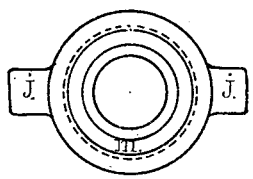
Figure 1:
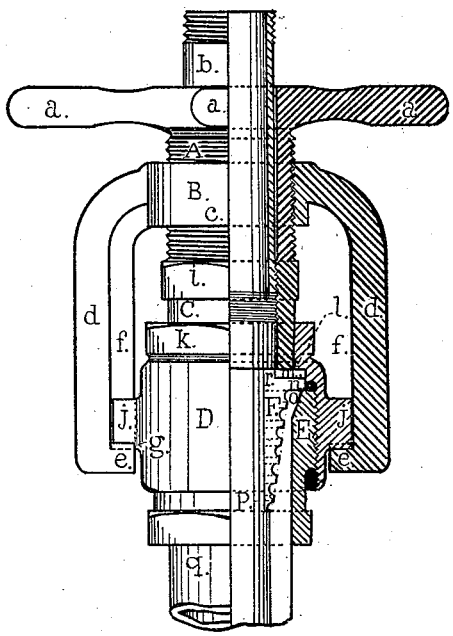
Figure 7:
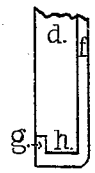
Figure 3:
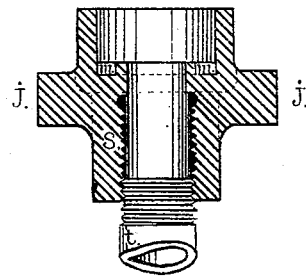

Figure 1 is a view of the coupling completed, when a section of inflexible gas-pipe is coupled with a section of flexible rubber hose. One-half of the drawing is full and the other in section. Fig. 2 is an end view of the same when viewing it through the conduit. Fig. 3 is a sectional view of the female half of the coupling when two inflexible sections of gas-pipe are coupled together. Fig. 4 is an end view of the same. Fig. 5 is a section side view of the stop to close the ends of the continuous pipe. Fig. 6 is an end view of the same. Fig. 7 is a section of one end of the yoke-arm, to show the flanges and recesses more fully.

Like letters of reference indicate like parts in each.

The object of my invention is to couple or unite short sections of pipes or hose in one continuous conduit, for transmitting or holding elastic or non-elastic fluids, capable of being interchanged when desirable, to couple in alternate sections inflexible pipes with rubber or flexible conduits, and to close the ends thereof.

To enable others skilled in the art to make and use my improvements, I will proceed to describe its construction and mode of operation.

The male half of my coupling (see Fig. 1) is composed of a cylinder, A, a yoke, B, and cylinder C. A has levers $a$ $a$ $a$ $a$ cast upon one end to turn by hand, or a hexagon form may be substituted for a wrench. The internal diameter must be large enough to slide freely over the pipe $b$. A screw-thread is cut upon its outer diameter from the levers to its end. The yoke B has a screw-thread cut within its hub $c$, into which A is screwed. From the opposite sides of the hub the arms $d$ $d$ project downwardly, having hooks $e$ $e$ turned at right angles inwardly, as a fulcrum to hold the lugs J J and draw the male and female couplings together. Ribs $ff$ are cast upon the opposite internal sides of the yoke-arms as a stop to prevent the opposite female half of the coupling from turning beyond a quarter-revolution. Small flanges $g$ (see Fig. 7) are cast upon the hooks $e$ $e$, in opposite sides to the flanges $ff$, to prevent the escape of the female coupling until lifted from the recess $h$. The cylinder or nipple C has an external hexagon end, $i$, for the use of a wrench to screw it upon the end of the inflexible pipe $b$.

To complete the male half of the coupling, first screw the cylinder A into the hub $c$ of the yoke B; then slip A over the pipe $b$; then screw the cylinder or nipple C hard upon the end of the pipe $b$, when, if necessary, it may be riveted or soldered in the inner side of C, or keyed on with a feather, or with mechanical fastenings, that will prevent it from unscrewing or getting loose by frequent use.

When a flexible pipe or gum hose is coupled with an inflexible gas-pipe, as shown in Fig. 1, the female half consists of a cylinder, D, an annular ring, E, and a flanged hose-thimble, F, and gasket $m$. The cylinder D has lugs J J cast upon its opposite sides, so that they will turn between the inner edges of the arms $d$ $d$ and a hexagon form, $k$, on the smaller end, to be turned with a wrench. The enlarged end has a screw-thread cut within it, into which the annular ring E screws, also an offset or shoulder, $l$, to hold the gasket $m$ against the flange $n$, to prevent its loss until D and E are unscrewed from each other. The annular ring E has a screw-thread cut upon its outer diameter from the hexagon end. The area of its inner diameter equals the outer diameter of the flexible hose, excepting at O, where it is bell-shaped, to prevent cutting or tearing the flexible hose when forced over it. The hose-thimble F is corrugated; the diameter at its smallest end $p$ equals the inner diameter of the flexible hose, from which it is enlarged to the flange $n$. On the opposite side of the flange $n$ I cast a small circular ring, $r$, common to "gas-unions," which is to prevent the gasket from being pressed into the main conduit.

To complete the female half of the coupling, slip the annular ring E over the flexible hose $q$; then force the nipple F into the end of the hose $q$ until its end is pressed hard against the flange $n$; then force the annular ring over the hose and nipple until it also nearly touches the flange $n$; then drop the gasket into the enlarged end of D until it rests on the offset $l$; then enter the nipple F until the flange rests against the gasket $m$, when D and E may be screwed together, when the flange $n$ of the nipple F and gasket $m$ will be firmly held between the shoulder $r$ in D and the end of E, and the flexible hose will be compressed in the corrugated rings that surround the nipple F, when the female half of my improved coupling will also be completed. Then slip the smaller end of the female half of the coupling between the arms $d\ d$ of the yoke B until the end of the cylinder C touches the gasket $m$; then turn the hose one quarter-revolution, or until the lugs J J are stopped by the flanges $ff$; then drop the lugs into the recesses $h\ h$, when, by turning the arms or levers of the cylinder $a\ a\ a\ a$, the cylinder A will draw the yoke B in a line with the axis of the pipe $b$, and complete the coupling of the inflexible pipe $b$ with flexible pipe $q$.

When it becomes desirable to unite two inflexible pipes, substitute the female coupling $s$, (see Fig. 3,) in which a section of inflexible pipe, $t$, is shown; or, to stop the ends of the pipe, substitute $u$. (See Fig. 5.) It will thus be observed that the male half of the coupling (see Fig. 1) is capable of coupling with a flexible or inflexible pipe or a blind to stop the end of the pipe.

I claim as new and of my invention—

1. The herein-described male half of a pipe-coupling, consisting of the cylinder A, yoke B, and nipple C, arranged in relation to each other and the pipe $b$, substantially as and for the purposes set forth.

2. The herein-described pipe-coupling for coupling flexible and inflexible conduits together, consisting of the cylinder A, yoke B, cylinder C, cylinder D, cylinder E, and nipple F, arranged in relation to each other and to the inflexible pipe $b$ and flexible pipe $q$, substantially as and for the purposes set forth.

3. The lugs $jj$, hooks $ee$, flanges $ff$, recesses $h\ h$, flange $n$, collar E, having its upper end cut away on the inside, the shoulder $l$, in their respective relations to each other and the above-described hose-coupling, substantially as and for the purposes set forth.

WM. LOUGHRIDGE.

Witnesses:
 GEO. H. CARMAN,
 C. E. LEWIS.